United States Patent
Roplekar et al.

(10) Patent No.: US 10,995,653 B2
(45) Date of Patent: May 4, 2021

(54) FAN POWERED BY AN ALTERNATING CURRENT GENERATOR ASSOCIATED WITH A LIQUID-COOLED ENGINE OF AN ENGINE SYSTEM

(71) Applicant: Caterpillar Inc., Deerfield, IL (US)

(72) Inventors: Jay Roplekar, Peoria, IL (US); Antonis Dris, Godmanchester (GB)

(73) Assignee: Caterpillar Inc., Peoria, IL (US)

( * ) Notice: Subject to any disclaimer, the term of this patent is extended or adjusted under 35 U.S.C. 154(b) by 42 days.

(21) Appl. No.: 16/238,035

(22) Filed: Jan. 2, 2019

(65) Prior Publication Data

US 2020/0208566 A1    Jul. 2, 2020

(51) Int. Cl.
| | |
|---|---|
| *F01P 11/10* | (2006.01) |
| *F01P 7/16* | (2006.01) |
| *F01P 3/18* | (2006.01) |
| *F02B 63/04* | (2006.01) |
| *H02K 7/18* | (2006.01) |
| *F02B 73/00* | (2006.01) |

(52) U.S. Cl.
CPC ............ *F01P 11/10* (2013.01); *F01P 3/18* (2013.01); *F01P 7/16* (2013.01); *F02B 63/042* (2013.01); *F02B 73/00* (2013.01); *H02K 7/1815* (2013.01); *F01P 2023/08* (2013.01); *F01P 2025/13* (2013.01); *F01P 2025/30* (2013.01)

(58) Field of Classification Search
CPC .................................................... F01P 11/10
See application file for complete search history.

(56) References Cited

U.S. PATENT DOCUMENTS

| | | | |
|---|---|---|---|
| 5,890,460 | A | 4/1999 | Ball et al. |
| 7,265,463 | B2 | 9/2007 | Kusase et al. |
| 8,550,038 | B2 | 10/2013 | Marlenee et al. |
| 8,677,948 | B2 | 3/2014 | Steffi |
| 9,945,281 | B2 | 4/2018 | Pitcel et al. |
| 2013/0313243 | A1 * | 11/2013 | Gonze ............ F01N 3/027 219/205 |

FOREIGN PATENT DOCUMENTS

| | | |
|---|---|---|
| CN | 200973047 Y | 11/2007 |
| JP | 2002136053 A | 5/2002 |
| JP | 2013092128 | 5/2013 |

* cited by examiner

*Primary Examiner* — Charles Reid, Jr.
(74) *Attorney, Agent, or Firm* — Harrity & Harrity LLP

(57) ABSTRACT

A generator set is disclosed. The generator set may include a liquid-cooled engine and an alternating current (AC) generator coupled to the liquid-cooled engine. The generator set may include an AC fan associated with the liquid-cooled engine and connected to the AC generator via a relay and an engine control module (ECM) associated with the liquid-cooled engine and connected to the AC fan via the relay. The generator set may include an engine temperature sensor associated with the liquid-cooled engine and connected to the ECM via a first circuit and an engine air temperature sensor associated with the liquid-cooled engine and connected to the ECM via a second circuit.

20 Claims, 3 Drawing Sheets

FAN POWERED BY AN ALTERNATING CURRENT GENERATOR ASSOCIATED WITH A LIQUID-COOLED ENGINE OF AN ENGINE SYSTEM

TECHNICAL FIELD

The present disclosure relates generally to a fan and, more particularly, to a fan powered by an alternating current generator associated with a liquid-cooled engine of an engine system.

BACKGROUND

A plurality of internal combustion engine systems, wherein each engine system includes a generator (e.g., a main alternator), may be used in various implementations to provide power to a load when a single engine system is not sufficient to provide power to the load. For example, a plurality of generators (e.g., which may be referred to as a "generator set" or "genset") may be configured to provide electrical power to a load that requires more power than a single generator can output. In some cases, an engine system may include a fan to cool an engine of the engine system. However, in these cases the fan is a mechanically driven component of the engine system and requires an elaborate mounting of components (e.g., pulleys, belts, etc.) on the engine. These components may be expensive and/or prone to failure, damage, and/or the like.

One attempt to provide an electric cooling fan system for an air-cooled engine is disclosed in U.S. Pat. No. 9,945,281 that was filed by Briggs & Stratton Corporation on Dec. 15, 2015 and issued on Apr. 17, 2018 ("the '281 patent"). In particular, the '281 patent discloses an electric cooling fan system for an air-cooled engine suitable for use with small, outdoor power equipment, such as lawn mowers, riding tractors, snow throwers, pressure washers, portable generators, and/or the like. The electric cooling fan system disclosed in the '281 patent can receive power directly from a standby generator (e.g., the electric cooling fan system may be electrically coupled to a charging system (e.g., an alternator) of an air-cooled internal combustion engine) and can be configured to be powered by 120V alternating current.

While the electric cooling fan system of the '281 patent may be powered by the charging system of an internal combustion engine, the '281 patent is explicitly directed to only a single, small air-cooled engine. For example, the '281 patent discloses that the electric cooling fan system may be used as an alternative to reduce noise levels associated with a conventional crankshaft mounted fan design for an air-cooled home standby generator. Further, the '281 patent describes the electric cooling fan system as being configured to be powered by only 120V of alternating current output by an air-cooled home standby generator.

The '281 patent does not disclose using a fan connected to an alternating current generator (e.g., a main alternator) of a large, liquid-cooled engine of an engine system, to selectively cool the liquid-cooled engine and/or liquid coolant used to facilitate cooling of the liquid-cooled engine. Moreover, the '281 patent does not disclose a fan being configured to be powered by alternating current output that exceeds 120V. Therefore, the fan powered by an alternating current generator associated with a liquid-cooled engine of an engine system of the present disclosure solves one or more problems set forth above and/or other problems in the art.

SUMMARY

According to some implementations, the present disclosure is related to an engine system. The engine system may include a liquid-cooled engine and an alternating current (AC) generator (e.g., a main alternator) coupled to the liquid-cooled engine. The engine system may include an AC fan connected to the AC generator via a relay and an engine control module (ECM) connected to the AC fan via the relay. The engine system may include an engine temperature sensor, such as an engine coolant temperature sensor, connected to the ECM via a first circuit and an engine air temperature sensor, such an engine air inlet temperature sensor, connected to the ECM via a second circuit.

According to some implementations, the present disclosure is related to a machine. The machine may include a first engine system and a second engine system. At least one of the first engine system or the second engine system may include a liquid-cooled engine and an alternating current (AC) generator (e.g., a main alternator) coupled to the liquid-cooled engine. The at least one of the first engine system or the second engine system may include an AC fan associated with the liquid-cooled engine and connected to the AC generator via a relay, and an engine control module (ECM) associated with the liquid-cooled engine and connected to the AC fan via the relay. The at least one of the first engine system or the second engine system may include an engine temperature sensor, such as an engine coolant temperature sensor, associated with the liquid-cooled engine and connected to the ECM via a first circuit, and an engine air temperature sensor, such as an engine air inlet temperature sensor, associated with the liquid-cooled engine and connected to the ECM via a second circuit.

According to some implementations, the present disclosure is related to a generator set. The generator set may include a liquid-cooled engine and an alternating current (AC) generator (e.g., a main alternator) coupled to the liquid-cooled engine. The generator set may include an AC fan associated with the liquid-cooled engine and connected to the AC generator via a relay and an engine control module (ECM) associated with the liquid-cooled engine and connected to the AC fan via the relay. The generator set may include an engine temperature sensor, such as an engine coolant temperature sensor, associated with the liquid-cooled engine and connected to the ECM via a circuit and an engine air temperature sensor, such as an engine air inlet temperature sensor, associated with the liquid-cooled engine and connected to the ECM via the circuit.

DETAILED DESCRIPTION

This disclosure relates to a fan powered by an alternating current generator associated with a liquid-cooled engine of an engine system. The fan powered by an alternating current generator associated with a liquid-cooled engine of an engine system has universal applicability to any machine utilizing such a fan powered by an alternating current generator associated with a liquid-cooled engine of an engine system. The term "machine" may refer to any machine that performs an operation associated with an industry such as, for example, mining, construction, farming, transportation, or any other industry. As some examples, the machine may be a generator system, a vehicle (e.g., a land-based vehicle or marine vehicle), a fracture rig, and/or the like. Moreover, one or more implements may be connected to the machine and controlled using the engine system associated with the fan powered by the alternating current generator associated with the liquid-cooled engine of the engine system described herein.

Figure 1:
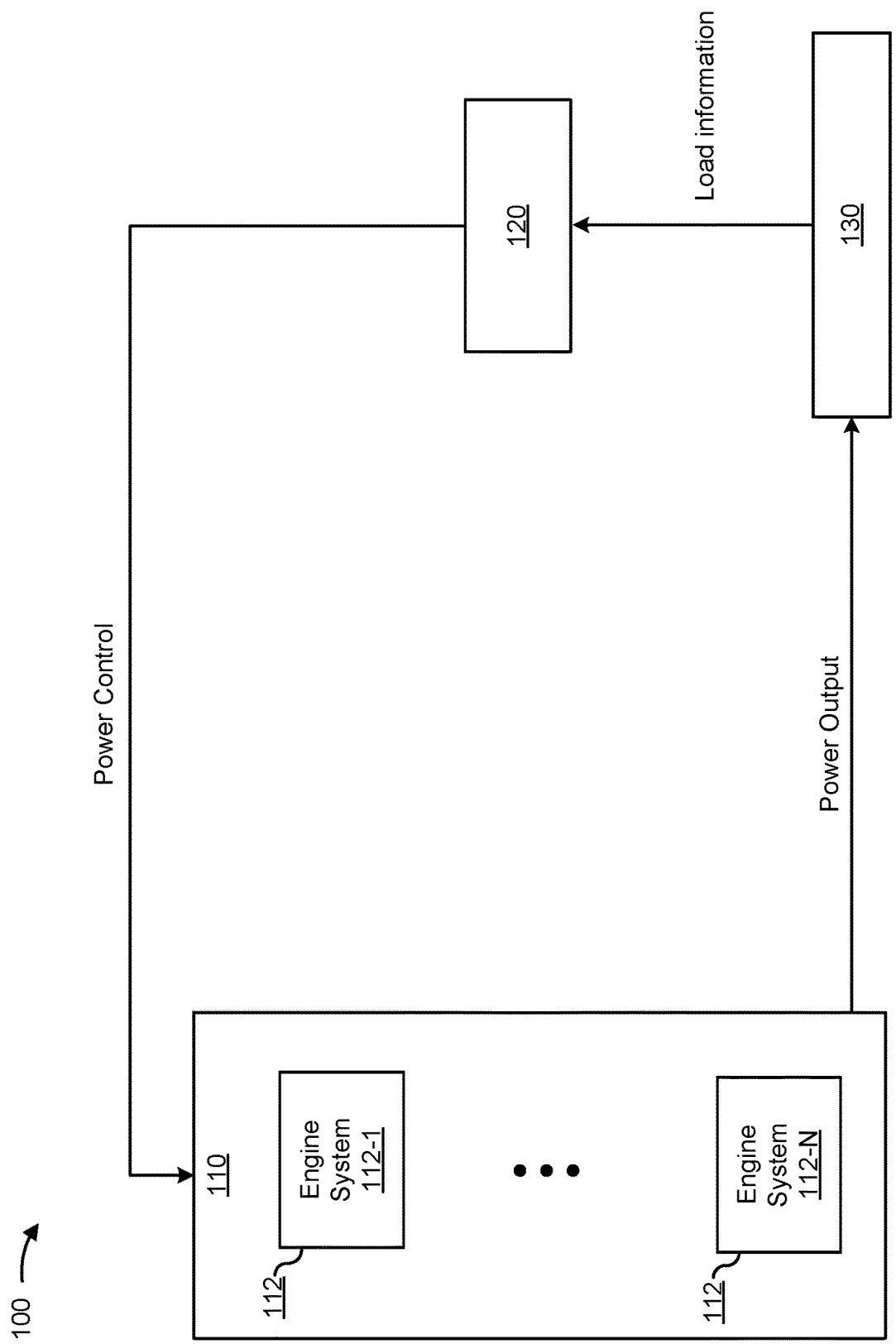
FIG. 1 is a diagram of an example power system described herein.

FIG. 1 is a diagram of an example power system 100 described herein. Power system 100 of FIG. 1 includes power generation system 110 with a plurality of engine systems 112 (shown as engine system 1 to engine system N, where N is an integer and N>1), an engine controller 120, and a load 130. The plurality of engine systems 112 may be referred to herein collectively as "engine systems 112" or individually as "engine system 112." As shown and described herein, engine controller 120 may control engine systems 112 of power generation system 110 to provide mechanical and/or electrical power to load 130. In some implementations, load 130 may include one or more electrical power consuming devices, such as an air conditioning system for a manufacturing facility, an emergency lighting system for an office building, and/or the like.

In some implementations, the plurality of engine systems 112 may be a set of generators (e.g., which may be referred to as a "generator set" or "genset") configured to provide electrical power to a load. As described herein, one or more of engine systems 112 may include a compression ignition, internal combustion engine. Additionally, or alternatively, one or more of engine systems 112 may include any other type of internal combustion engine, such as, for example, a spark, laser, or plasma ignition engine. The engines of engine systems 112 may be fueled by distillate diesel fuel, biodiesel, dimethyl ether, hydrogen, natural gas, propane, alcohol, ethanol, and/or the like, and/or any combination thereof. The engines of engine systems 112 may be liquid-cooled engines that use liquid coolant to facilitate cooling of the liquid-cooled engines. In some implementations, a liquid-cooled engine of an engine system 112 may include at least one component, such as a coolant chamber, for holding the liquid coolant and allowing the liquid coolant to facilitate cooling the liquid-cooled engine.

In some implementations, each of the engine systems 112 may include a same type of engine. For example, all engine systems 112 may include engines that are a same model, made by a same manufacturer, configured to output a same amount of maximum power and/or torque, configured to operate in a same manner, and/or the like. In some implementations, one or more of the engines of the engine systems 112 may be a different type relative to another engine of the engine systems 112. In such cases, a first engine may be a first type of engine configured to output a first amount of maximum power and a second engine may be a second type of engine configured to output a second amount of maximum power that is different from the first amount of maximum power. Furthermore, the engines of engine systems 112 may be made by a different manufacturer and/or be a different model of engine.

Engine controller 120 may include one or more devices that provide power control information to control power output from power generation system 110. In some implementations, engine controller 120 may be implemented as a processor, such as a central processing unit (CPU), an accelerated processing unit (APU), a microprocessor, a microcontroller, a digital signal processor (DSP), a field-programmable gate array (FPGA), an application-specific integrated circuit (ASIC), or another type of processing component. The processor may be implemented in hardware, firmware, and/or a combination of hardware and software. In some implementations, engine controller 120 may include one or more processors capable of being programmed to perform a function. In some implementations, one or more memories, including a random access memory (RAM), a read only memory (ROM), and/or another type of dynamic or static storage device (e.g., a flash memory, a magnetic memory, and/or an optical memory) may store information and/or instructions for use by engine controller 120. In some implementations, engine controller 120 may include a memory (e.g., a non-transitory computer-readable medium) capable of storing instructions, that when executed, cause the processor to perform one or more processes and/or methods described herein.

Engine controller 120 may include any appropriate type of engine control system configured to perform optimization functions, prioritization functions, and/or power control functions. In operation, engine controller 120 may execute computer software instructions to perform various control functions and processes to control power generation system 110. As shown in the example of FIG. 1, engine controller 120 (e.g., via execution of the computer software instructions) provides power control information to power generation system 110 to provide power output to load 130, which may include one or more devices driven by electrical power.

As indicated above, FIG. 1 is provided as an example. Other examples are possible and may differ from what is described in connection with FIG. 1.

Figure 2:
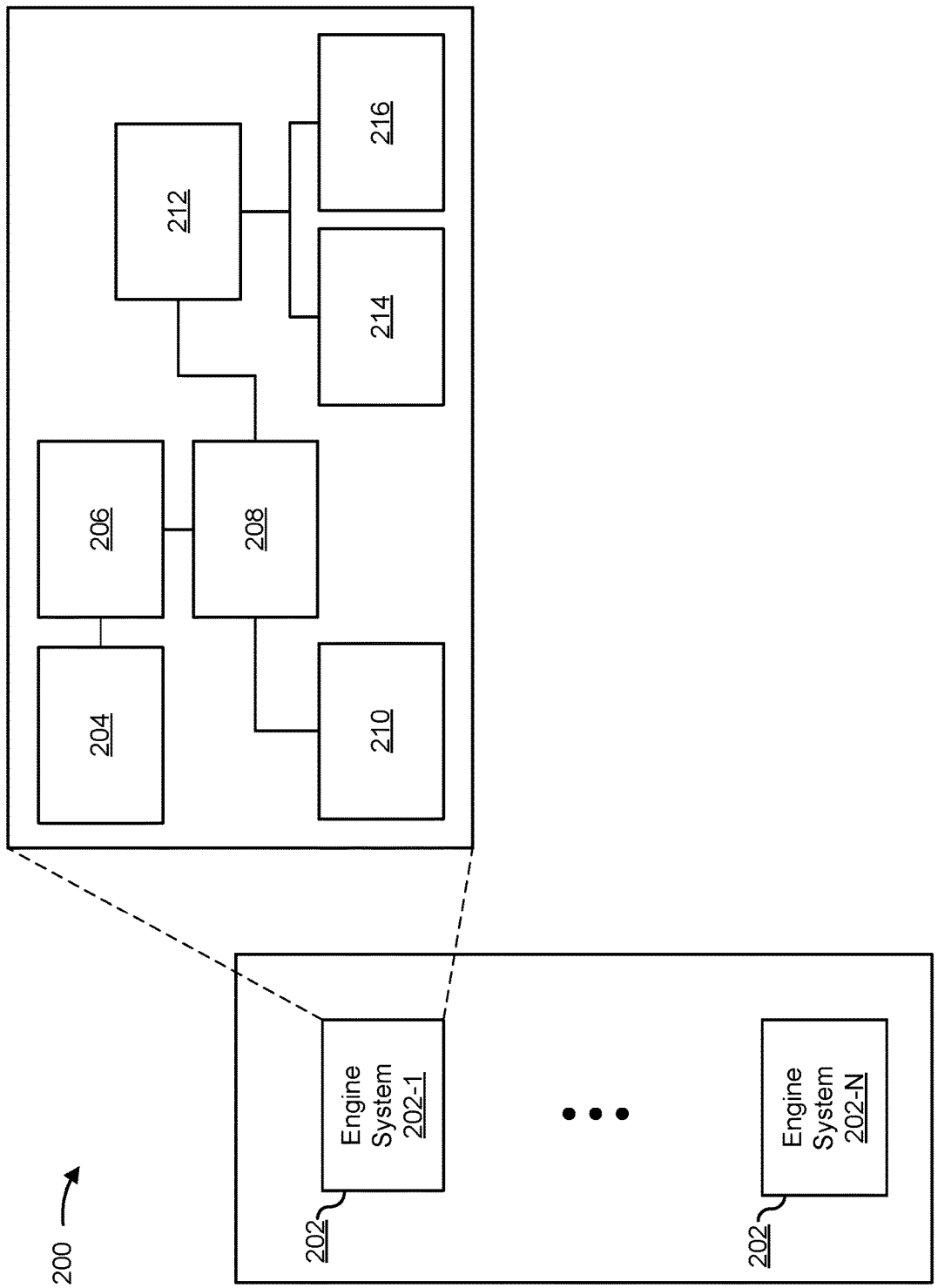
FIG. 2 is a diagram of example engine systems that may be included within the power system of FIG. 1, as described herein.

FIG. 2 is a diagram of an example power generation system 200 that includes a plurality of engine systems 202 (shown as engine system 1 to engine system N, where N is an integer and N>1). Engine system 202-1 is a representative engine system of the plurality of engine systems 202. In some implementations, engine system 202-1 may include one or more components, such as a liquid-cooled engine 204, an alternating current (AC) generator 206 (e.g., a main alternator), a relay 208, an AC fan 210, an engine control module (ECM) 212, an engine temperature sensor 214, an engine air temperature sensor 216, and/or the like.

In some implementations, the liquid-cooled engine 204 may be a liquid-cooled engine that uses a liquid coolant to facilitate cooling of the liquid-cooled engine 204. In some implementations, the liquid-cooled engine 204 may include at least one component, such as a coolant chamber, for holding the liquid coolant and allowing the liquid coolant to facilitate cooling the liquid-cooled engine 204.

In some implementations, the AC generator 206 may be operably coupled to the liquid-cooled engine 204. For example, the liquid-cooled engine 204 may be configured to cause rotation of one or more components of the AC generator 206. In some implementations, the AC generator 206 may include an alternator that is configured to convert the mechanical input from the liquid-cooled engine 204 into electricity. For example, the AC generator 206 may include a rotor assembly coupled to a rotating shaft of the liquid-cooled engine 204 (e.g., via engine pulleys) and configured to rotate within a stator assembly to generate electrical energy. In some implementations, the AC generator 206 may convert the mechanical input from the liquid-cooled engine 204 into AC electricity. In some implementations, the alternating current electricity may have a voltage range, such as a voltage range of 200-380 volts. In some implementations, the AC generator 206 may be configured to supply generated electrical energy to meet an electrical load in the form of electrical current supplied through one or more electrical connections. In some implementations, the AC generator 206 may provide AC electricity to the AC fan 210 via the one or more electrical connections and/or relay 208.

In some implementations, an electrical connection, of the one or more electrical connections, may be an electrical circuit. In some implementations, the one or more electrical connections may allow electrical current to flow from one electrical component to another electrical component. For example, the one or more electrical connections may allow electrical current (e.g., AC electricity) to flow from the AC generator 206 to the AC fan 210 via the relay 208 to allow the AC fan 210 to operate.

In some implementations, the AC fan 210 may be connected to the AC generator 206 via the one or more electrical connections and/or the relay 208. In some implementations, the AC fan 210 may operate using the alternating current electricity generated by the AC generator 206 (e.g., a main alternator). In some implementations, the AC fan 210 may operate using alternating current electricity within a voltage range, such as a voltage range of 200-380 volts.

In some implementations, the AC fan 210 may produce airflow to cool the liquid-cooled engine 204 and/or the liquid coolant used to facilitate cooling of the liquid-cooled engine 204. For example, the AC fan 210 may be pointed toward the liquid-cooled engine 204 to direct the airflow produced by the AC fan 210 at the liquid-cooled engine 204 to cool the liquid-cooled engine 204. As another example, the AC fan 210 may be pointed toward at least one particular component of the liquid-cooled engine 204, such as a coolant chamber of the liquid-cooled engine 204, to direct the airflow produced by the AC fan 210 at the at least one particular component to cool the liquid coolant. In some implementations, the AC fan 210 may produce an amount of airflow within an airflow amount range, such as 5,000-45,000 cubic meters per hour.

In some implementations, the AC fan 210 may be connected to the ECM 212 via the one or more electrical connections and relay 208. In some implementations, the ECM 212 may include one or more devices that provide control of the liquid-cooled engine 204, the relay 208, and/or the AC fan 210. In some implementations, the ECM 212 is implemented as a processor, such as a central processing unit (CPU), an accelerated processing unit (APU), a microprocessor, a microcontroller, a digital signal processor (DSP), a field-programmable gate array (FPGA), an application-specific integrated circuit (ASIC), and/or another type of processing component. The processor is implemented in hardware, firmware, and/or a combination of hardware and software. In some implementations, the ECM 212 may include one or more processors capable of being programmed to perform a function. In some implementations, one or more memories, including a random access memory (RAM), a read only memory (ROM), and/or another type of dynamic or static storage device (e.g., a flash memory, a magnetic memory, and/or an optical memory) may store information and/or instructions for use by the ECM 212. In some implementations, the ECM 212 may include a memory (e.g., a non-transitory computer-readable medium) capable of storing instructions, that when executed, cause the processor to perform one or more processes and/or methods described herein.

In some implementations, the ECM 212 may execute the instructions to perform various control functions and processes to control the liquid-cooled engine 204, the relay 208, and/or the AC fan 210. In some implementations, the ECM 212 may include any appropriate type of engine control system configured to perform engine control functions such that the liquid-cooled engine 204 may operate properly. In some implementations, the ECM 212 may control the relay 208 to selectively operate the AC fan 210 (e.g., activate and/or deactivate the AC fan 210, turn the AC fan 210 on and/or off, and/or the like). For example, the ECM 212 may control the relay 208 to allow alternating current electricity to flow from the AC generator 206 to the AC fan 210, which causes the AC fan 210 to operate. As another example, the ECM 212 may control the relay 208 to prevent alternating current electricity from flowing from the AC generator 206 to the AC fan 210, which causes the AC fan 210 to cease operating. In some implementations, the ECM 212 may control the AC fan 210 by sending one or more signals (e.g., an activation signal and/or a deactivation signal) to the AC fan 210.

In some implementations, the relay 208 may be an electromechanical relay, a solid state relay, and/or the like. In some implementations, the relay 208 is connected to the AC generator 206 and the AC fan 210 via the one or more electrical connections in order to allow the AC generator 206 to send AC electricity to the AC fan 210. In some implementations, the relay 208 is connected to the AC fan 210 and the ECM 212 via one or more electrical connections in order to allow the ECM 212 to control the AC fan 210 (e.g., by allowing the ECM 212 to send an activation signal and/or deactivation signal to the AC fan 210). In some implementations, the ECM 212 may control the relay 208 to allow the AC generator 206 to send AC electricity to the AC fan 210, and/or to prevent the AC generator 206 from sending AC electricity to the AC fan 210.

In some implementations, the ECM 212 is connected to the engine temperature sensor 214 and/or the engine air temperature sensor 216 via the one or more electrical connections. In some implementations, the engine temperature sensor 214 may be an engine coolant temperature sensor. In some implementations, the engine temperature sensor 214 may determine an engine temperature associated with the liquid-cooled engine 204 and/or the liquid coolant used by the liquid-cooled engine 204, such as a temperature of the liquid-cooled engine 204, a temperature of a component of the liquid-cooled engine 204, a temperature of the liquid coolant used to cool the liquid-cooled engine 204, a temperature of a component of the liquid-cooled engine 204 used to hold the liquid coolant, and/or the like. In some implementations, the engine temperature sensor 214 may send engine temperature data to the ECM 212 via the one or more electrical connections. In some implementations, the engine temperature sensor 214 may send a signal to the ECM 212 indicating whether the engine temperature satisfies an engine temperature threshold (e.g., whether the engine temperature is greater than or equal to the engine temperature threshold, whether the engine temperature is less than the engine temperature threshold, and/or the like).

In some implementations, the engine air temperature sensor 216 may be an engine air inlet temperature sensor. In some implementations, the engine air temperature sensor 216 may determine an engine air temperature associated with the liquid-cooled engine 204, such as a temperature of ambient air around the liquid-cooled engine 204, a temperature of air within the liquid-cooled engine 204, a temperature of air entering a compressor of the liquid-cooled engine 204, and/or the like. In some implementations, the engine air temperature sensor 216 may send engine air temperature data to the ECM 212 via the one or more electrical connections. In some implementations, the engine air temperature sensor 216 may send a signal to the ECM 212 indicating whether the engine air temperature satisfies an engine air temperature threshold (e.g., whether the engine air temperature is greater than or equal to the engine air temperature threshold, whether the engine air temperature is less than the engine air temperature threshold, and/or the like).

In some implementations, the ECM 212 may obtain the engine temperature data from the engine temperature sensor 214 and/or the engine air temperature data from the engine air temperature sensor 216 to control operation of the AC fan 210. In some implementations, the ECM 212 may selectively turn the AC fan 210 on and/or off based on the engine temperature data and/or the engine air temperature data. For example, the ECM 212 may turn the AC fan 210 on (e.g., activate the AC fan 210) when the engine temperature data indicates that the engine temperature satisfies the engine temperature threshold (e.g., the engine temperature is greater than or equal to the engine temperature threshold) and/or the engine air temperature data indicates that the engine air temperature satisfies the engine air temperature threshold (e.g., the engine air temperature is greater than or equal to the engine air temperature threshold). As another example, the ECM 212 may turn the AC fan 210 off (e.g., deactivate the AC fan 210) when the engine temperature data indicates that the engine temperature does not satisfy the engine temperature threshold (e.g., the engine temperature is less than the engine temperature threshold) and/or the engine air temperature data indicates that the engine air temperature does not satisfy the engine air temperature threshold (e.g., the engine air temperature is less than the engine air temperature threshold).

In some implementations, the ECM 212 may receive the signal indicating whether the engine temperature satisfies an engine temperature threshold from the engine temperature sensor 214. In some implementations, the ECM 212 may activate and/or deactivate the AC fan 210 based on the signal indicating whether the engine temperature satisfies the engine temperature threshold (e.g., activate the AC fan 210 if the signal indicates that the engine temperature satisfies the engine temperature threshold, deactivate the AC fan 210 if the signal indicates that the engine temperature does not satisfy the engine temperature threshold, and/or the like). In some implementations, the ECM 212 may receive the signal indicating whether the engine air temperature satisfies an engine air temperature threshold from the engine air temperature sensor 216. In some implementations, the ECM 212 may activate and/or deactivate the AC fan 210 based on the signal indicating whether the engine air temperature satisfies the engine air temperature threshold (e.g., activate the AC fan 210 if the signal indicates that the engine air temperature satisfies the engine air temperature threshold, deactivate the AC fan 210 if the signal indicates that the engine air temperature does not satisfy the engine air temperature threshold, and/or the like).

Accordingly, some implementations allow the AC generator 206 (e.g., a main alternator) to provide AC electricity to the AC fan 210 and/or allow the ECM 212 to control operation of the AC fan 210. In this way, the engine system 202-1 does not need a mechanically driven fan to cool the liquid-cooled engine 204 and/or the liquid coolant used to facilitate cooling of the liquid-cooled engine 204.

The number and arrangement of components shown in FIG. 2 are provided as an example. In practice, there may include additional components, fewer components, different components, or differently arranged components than those shown in FIG. 2. Additionally, or alternatively, a set of components (e.g., one or more components) of power generation system 200 may perform one or more functions described as being performed by another set of components of power generation system 200.

Figure 3:
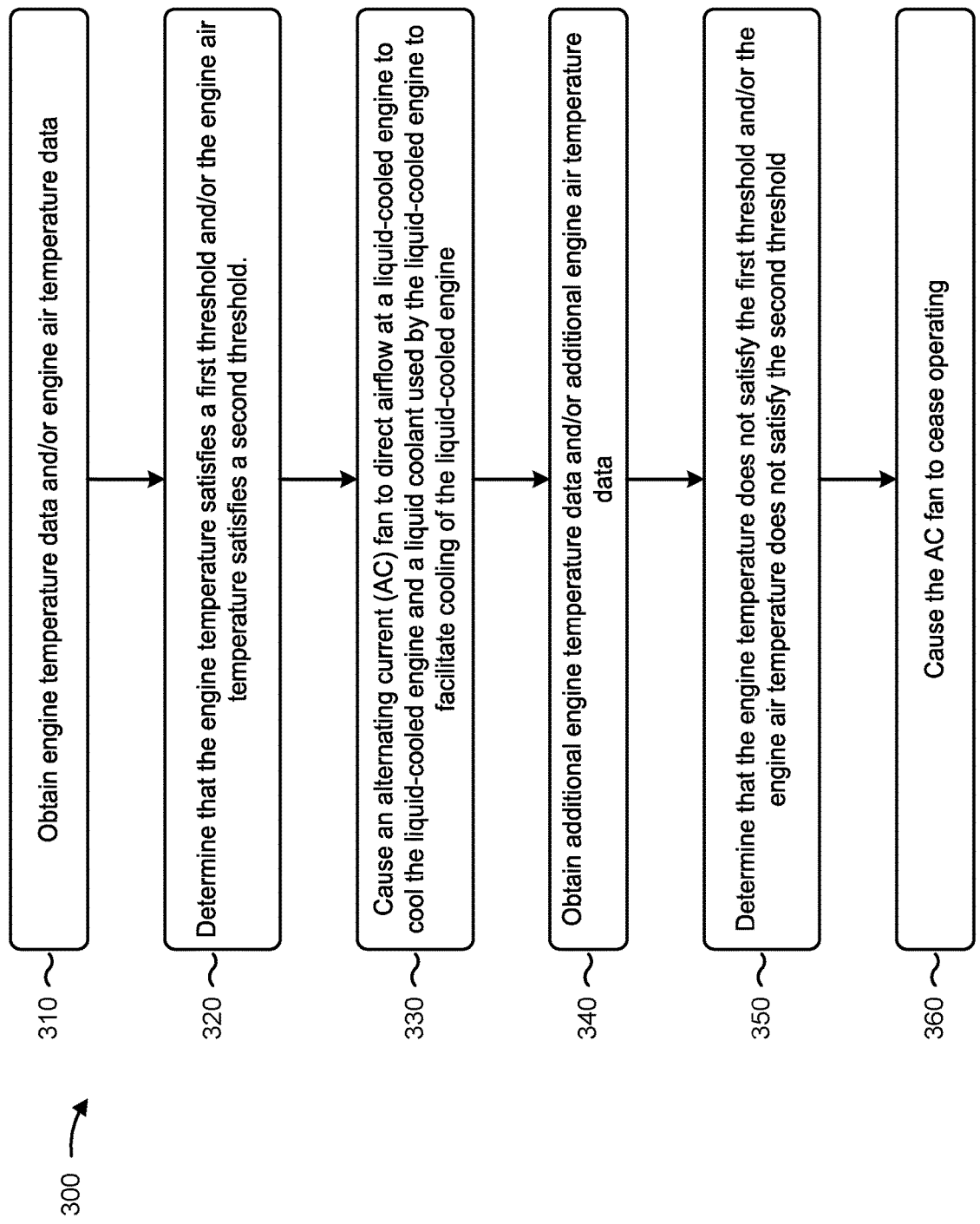
FIG. 3 is a diagram of an example process associated with a fan powered by an alternating current generator associated with a liquid-cooled engine of an engine system.

FIG. 3 is a flow chart of an example process 300 associated with a fan powered by an alternating current generator associated with a liquid-cooled engine of an engine system. In some implementations, one or more process blocks of FIG. 3 may be performed by an engine control module (ECM) (e.g., ECM 212). In some implementations, one or more process blocks of FIG. 3 may be performed by another device or a group of devices separate from or including the ECM, such as an alternating current (AC) fan (e.g., AC fan 210), a relay (e.g., relay 208), an engine temperature sensor (e.g., engine temperature sensor 214), an engine air temperature sensor (e.g., engine air temperature sensor 216), and/or the like.

As shown in FIG. 3, process 300 may include obtaining engine temperature data and/or engine air temperature data (block 310). For example, the ECM (e.g., using one or more processors, one or more memories, and/or the like) may obtain engine temperature data and/or engine air temperature data, as described above.

As shown in FIG. 3, process 300 may include determining that the engine temperature satisfies a first threshold and/or the engine air temperature satisfies a second threshold (block 320). For example, the ECM (e.g., using one or more processors, one or more memories, and/or the like) may determine that the engine temperature satisfies a first threshold and/or the engine air temperature satisfies a second threshold, as described above.

As shown in FIG. 3, process 300 may include causing an alternating current (AC) fan to direct airflow at a liquid-cooled engine to cool the liquid-cooled engine and a liquid coolant used by the liquid-cooled engine to facilitate cooling of the liquid-cooled engine (block 330). For example, the ECM (e.g., using one or more processors, one or more memories, and/or the like) may cause an alternating current (AC) fan to direct airflow at a liquid-cooled engine to cool the liquid-cooled engine and a liquid coolant used by the liquid-cooled engine to facilitate cooling of the liquid-cooled engine, as described above.

As shown in FIG. 3, process 300 may include obtaining additional engine temperature data and/or additional engine air temperature data (block 340). For example, the ECM (e.g., using one or more processors, one or more memories, and/or the like) may obtain additional engine temperature data and/or additional engine air temperature data, as described above.

As shown in FIG. 3, process 300 may include determining that the engine temperature does not satisfy the first threshold and/or the engine air temperature does not satisfy the second threshold (block 350). For example, the ECM (e.g., using one or more processors, one or more memories, and/or the like) may determine that the engine temperature does not satisfy the first threshold and/or the engine air temperature does not satisfy the second threshold, as described above.

As shown in FIG. 3, process 300 may include causing the AC fan to cease operating (block 360). For example, the ECM (e.g., using one or more processors, one or more memories, and/or the like) may cause the AC fan to cease operating, as described above.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

In some instances, a power generation system may include a plurality of engine systems, where an engine system, of the plurality of engine systems, includes a liquid-cooled engine and one or more electrical components. In some instances, the engine system includes a generator (e.g., a main alternator for providing electrical power to a load) as well as a mechanically driven fan to cool the liquid-cooled engine and/or liquid coolant used to facilitate cooling of the liquid-cooled engine. However, the mechanically driven fan includes expensive, complex mechanical components that need to be mounted on the liquid-cooled engine of the engine system. Further, the mechanical components are prone to failure, damage, and/or the like and require regular maintenance and repair, which affects the operation and/or availability of the engine system.

According to some implementations described herein, a power generation system includes one or more engine systems, where an engine system (e.g., engine system 202-1) may include a liquid-cooled engine (e.g., liquid-cooled engine 204), an AC generator (e.g., AC generator 206), such as a main alternator, an AC fan (e.g., AC fan 210), and an ECM (e.g., ECM 212). In some implementations, the AC generator may be coupled to the liquid-cooled engine. In some implementations, the AC fan may be connected to the AC generator and/or the ECM via a relay (e.g., relay 208) and one or more electrical connections. In some implementations, the ECM may be connected to one or more sensors, such as engine temperature sensor (e.g., engine temperature sensor 214), an engine air temperature sensor (e.g., engine air temperature sensor 216), and/or the like via the one or more electrical connections.

Accordingly, the AC generator may generate and provide AC electricity to the AC fan, which may be controlled by the ECM to cool the liquid-cooled engine and/or liquid coolant used by the liquid-cooled engine to facilitate cooling of the liquid-cooled engine. Therefore, the liquid-cooled engine may not need a mechanically driven fan to cool the liquid-cooled engine and/or the liquid coolant. As a result, the mechanical complexity of the engine system associated with the liquid-cooled engine may be reduced. This may increase the life of the engine system and/or reduce the amount of maintenance that the engine system requires. Accordingly, costs associated with maintaining the engine system can be decreased and/or minimized.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

What is claimed is:

1. An engine system, comprising:
   a liquid-cooled engine;
   an alternating current (AC) generator coupled to the liquid-cooled engine;
   an AC fan connected to the AC generator via a relay;
   an engine control module (ECM) connected to the AC fan via the relay;
   an engine temperature sensor connected to the ECM via a first circuit; and
   an engine air temperature sensor connected to the ECM via a second circuit,
      wherein the engine system is one of a plurality of engine systems of a machine,
      wherein the plurality of engine systems further includes a different engine system, and
      wherein the different engine system includes a different liquid-cooled engine and a different AC fan.

2. The engine system of claim 1, wherein the AC fan is to direct airflow at a liquid coolant that cools the liquid-cooled engine.

3. The engine system of claim 1, wherein the liquid-cooled engine is cooled using a liquid coolant,
   wherein the engine temperature sensor is to determine a temperature of the liquid coolant.

4. The engine system of claim 1, wherein the engine air temperature sensor is to determine a temperature of ambient air around the liquid-cooled engine.

5. The engine system of claim 1, wherein the ECM is to control the relay to selectively operate the AC fan.

6. The engine system of claim 1, wherein the ECM is to obtain engine temperature data from the engine temperature sensor and engine air temperature data from the engine air temperature sensor.

7. The engine system of claim 6, wherein the ECM is to control, based on the engine temperature data and the engine air temperature data, operation of the AC fan.

8. A machine, comprising:
   a first engine system; and
   a second engine system,
      wherein the first engine system includes:
         a liquid-cooled engine,
         an alternating current (AC) generator coupled to the liquid-cooled engine,
         an AC fan associated with the liquid-cooled engine and connected to the AC generator via a relay,
         an engine control module (ECM) associated with the liquid-cooled engine and connected to the AC fan via the relay,
         an engine temperature sensor associated with the liquid-cooled engine and connected to the ECM via a first circuit, and
         an engine air temperature sensor associated with the liquid-cooled engine and connected to the ECM via a second circuit, and
      wherein the second engine system includes:
         a different liquid-cooled engine, and
         a different AC fan associated with the different liquid-cooled engine.

9. The machine of claim 8, wherein the ECM is to control the liquid-cooled engine and the AC fan,
   wherein the AC fan is to cool a liquid coolant of the liquid-cooled engine.

10. The machine of claim 8, wherein the ECM is to selectively turn the AC fan on and off based on at least one of engine temperature data from the engine temperature sensor or engine air temperature data from the engine air temperature sensor.

11. The machine of claim 8, wherein the ECM is to obtain engine temperature data from the engine temperature sensor and engine air temperature data from the engine air temperature sensor.

12. The machine of claim 11, wherein the ECM is to activate the AC fan based on the engine temperature data indicating an engine temperature that satisfies a threshold.

13. The machine of claim 11, wherein the ECM is to activate the AC fan based on the engine air temperature data indicating an engine air temperature that satisfies a threshold.

14. A generator set, comprising:
   a first engine system comprising:
      a liquid-cooled engine;
      an alternating current (AC) generator coupled to the liquid-cooled engine;
      an AC fan associated with the liquid-cooled engine and connected to the AC generator via a relay;
      an engine control module (ECM) associated with the liquid-cooled engine and connected to the AC fan via the relay;
      an engine temperature sensor associated with the liquid-cooled engine and connected to the ECM via a circuit; and
      an engine air temperature sensor associated with the liquid-cooled engine and connected to the ECM via the circuit; and
   a second engine system comprising:
      a different liquid-cooled engine, and
      a different AC fan associated with the different liquid-cooled engine.

15. The generator set of claim 14, wherein the liquid-cooled engine is to use a liquid coolant to cool the liquid-cooled engine,
   wherein the AC fan is to direct airflow at the liquid-cooled engine to cool the liquid-cooled engine and the liquid coolant.

16. The generator set of claim 14, wherein the relay is an electromechanical relay that is to allow the ECM to send an activation signal to the AC fan.

17. The generator set of claim 14, wherein the relay is a solid state relay that is to allow the AC generator to send AC electricity to the AC fan.

18. The generator set of claim 14, wherein the ECM is to activate the AC fan based on receiving a signal from the engine air temperature sensor indicating that an engine air temperature associated with the liquid-cooled engine satisfies a threshold.

19. The generator set of claim 14, wherein the ECM is to activate the AC fan based on receiving a signal from the engine temperature sensor indicating that an engine temperature of the liquid-cooled engine satisfies a threshold.

20. The generator set of claim 14, wherein the ECM is to deactivate the AC fan upon receiving:
   a signal from the engine temperature sensor indicating that an engine temperature of the liquid-cooled engine does not satisfy a first threshold; or
   a signal from the engine air temperature sensor indicating that an engine air temperature associated with the liquid-cooled engine does not satisfy a second threshold.

* * * * *